US011773993B2

(12) United States Patent
Willers et al.

(10) Patent No.: US 11,773,993 B2
(45) Date of Patent: Oct. 3, 2023

(54) NON-RETURN VALVE, IN PARTICULAR FOR A REFRIGERATION OR HEAT CIRCUIT (71) Applicant: OTTO EGELHOF GmbH & Co. KG, Fellbach (DE)

(72) Inventors: Eike Willers, Stuttgart (DE); Andreas Auweder, Vaihingen (DE); Rainer Maurer, Backnang (DE); Siegfried Roth, Gerlingen (DE); Uwe Hellmuth, Korb (DE); Bernhard Wagner, Fellbach (DE)

(73) Assignee: OTTO EGELHOF GmbH & Co. KG, Fellbach (DE)

( * ) Notice: Subject to any disclaimer, the term of this patent is extended or adjusted under 35 U.S.C. 154(b) by 269 days.

(21) Appl. No.: 17/055,648

(22) PCT Filed: May 15, 2019

(86) PCT No.: PCT/EP2019/062441
§ 371 (c)(1),
(2) Date: Nov. 16, 2020

(87) PCT Pub. No.: WO2019/219732
PCT Pub. Date: Nov. 21, 2019

(65) Prior Publication Data
US 2021/0222788 A1 Jul. 22, 2021

(30) Foreign Application Priority Data
May 16, 2018 (DE) ...................... 10 2018 111 811.2

(51) Int. Cl.
*F16K 15/06* (2006.01)
*F16K 27/02* (2006.01)
(52) U.S. Cl.
CPC ........ *F16K 15/063* (2013.01); *F16K 27/0209* (2013.01); *F25B 2341/063* (2013.01)
(58) Field of Classification Search
CPC .................................................. F16K 15/063
See application file for complete search history.

(56) References Cited

U.S. PATENT DOCUMENTS 4,930,539 A    6/1990  van Rooy
4,955,407 A    9/1990  Inoue et al.
(Continued)

FOREIGN PATENT DOCUMENTS

AU    2013297717 B2    10/2016
DE    40 25 488 A1      2/1991
(Continued)

OTHER PUBLICATIONS

International Search Report and Written Opinion for corresponding International Patent Application No. PCT/EP2019/062441 dated Aug. 14, 2019.

*Primary Examiner* — Eric Keasel
(74) *Attorney, Agent, or Firm* — KRIEGSMAN & KRIEGSMAN (57) ABSTRACT

The invention relates to a non-return valve, in particular for a refrigeration or heat circuit, which valve can be inserted into a connection opening (26, 27, 28, 29) of a connection device (21) or of a pipe (39) and comprises: —a one-part or multi-part housing (42) which comprises at least one main housing (44), a feed opening (48) being provided on the inlet side and a discharge opening (51) being provided on the outlet side of the main housing (44), the feed opening and the discharge opening being interconnected by a flow channel (49); —a guide element (53) which is provided on the main housing (44) and by means of which a valve closing element (61) is guided slidably relative to the main housing (44), the valve closing element (61) being arranged in a starting position (42) by means of an energy accumulator (71) and the valve closing element (61) being slidable toward the discharge opening (51) against an actuating force of the energy accumulator (71) in order to be transferred into a working position (63), and the energy accumulator (71) being provided between the valve closing element (75) and the main housing (44), the guide element (53) of the main housing (44) having at least one through-hole (57) and at least one guide rod (59) being guided in said at least one through-hole (57), which rod at least extends from the valve (Continued)

closing element (61) through the at least one through-hole (57) and is secured against release from the through-hole (57), or the guide element (53) being designed as a sleeve (54) having a bottom (55), which is associated with the discharge opening (51), and the valve closing element (61) having a guide portion (66) which acts on the sleeve (54).

21 Claims, 11 Drawing Sheets

(56) References Cited

U.S. PATENT DOCUMENTS

| | | | |
|---|---|---|---|
| 8,281,804 B2 * | 10/2012 | Lin | F16K 17/04 137/514.5 |
| 8,381,764 B2 * | 2/2013 | Matsubara | F16K 27/0209 137/220 |
| 9,353,876 B2 * | 5/2016 | Woollenweber | F02B 39/005 |
| 9,541,209 B2 * | 1/2017 | Hayashi | F16K 15/063 |
| 2005/0198979 A1 | 9/2005 | Robin et al. | |
| 2009/0250123 A1 | 10/2009 | Matsubara et al. | |
| 2010/0006159 A1 | 1/2010 | Lin et al. | |
| 2011/0126921 A1 | 6/2011 | Aguilar et al. | |
| 2017/0108135 A1 * | 4/2017 | Sierakowski-Larsen | F04D 29/4293 |

FOREIGN PATENT DOCUMENTS

| | | |
|---|---|---|
| DE | 10 2016 200 727 A1 | 7/2017 |
| EP | 2 674 650 A1 | 12/2013 |
| EP | 3156661 A1 | 4/2017 |
| JP | 2001-280521 A | 10/2001 |

* cited by examiner

NON-RETURN VALVE, IN PARTICULAR FOR A REFRIGERATION OR HEAT CIRCUIT

The invention relates to a check valve, which can be used in particular for a cooling or heating circuit.

A check valve is known from JP 2001-280 521 A, which consists of a two-part housing. In this housing, a flow channel is provided, which is closed in an initial position by a valve closing member. The valve closing member is guided in an opening of a basic housing by an axial guide rod. Between the basic housing and the valve closing member, an energy storage element is provided coaxially to the guide rod, which arranges the valve closing member in an initial position. In this initial position, the valve closing member closes the flow channel or an inlet opening on a valve housing, which is connected to the basic housing.

An analogous arrangement is known from AU 2013 297717 B2, DE 201 18 810 U1 and U.S. Pat. No. 4,955,407 A.

Such check valves serve to secure operating conditions and to control a direction of flow of a medium in a cooling or heating circuit, in particular a vehicle air conditioning system.

In cooling circuits, in particular with fluorine gases, a reduction of leakage is increasingly required to counteract the greenhouse effect. Every interface or connection point in a cooling circuit can contribute to the increase in the leakage rate.

The object of the invention is to propose a check valve for cooling or heating circuits which has a simple design and, in particular, allows use without an additional connection point in a cooling or heating circuit.

This object is solved by a check valve which comprises a one-piece or a multi-piece tubular housing, wherein a feed opening is provided on the inlet side and a discharge opening is provided on the outlet side on the basic body, wherein the feed opening and the discharge opening are connected to each other by a flow channel, and a guide element is provided on the basic housing, by means of which a valve closing member is guided displaceably to the basic housing, and the valve closing member is arranged in an initial position by means of a energy storage element, and in a working position, the valve closing member is displaceable in the direction of the discharge opening against an actuating force of the energy storage element, and is provided between the valve closing member and the housing. According to a first embodiment of the check valve, it is provided that the guide element of the basic housing has at least one aperture, and at least one guide rod is guided in this at least one aperture, which extends from the valve closing member through the at least one aperture and is secured against disengagement from this aperture. In this way, a simple and compact design of such a check valve is provided. This check valve can consist of only a few components and can comprise, for example, the energy storage element, the basic body and the valve closing member. In this way, a cost-effective production is ensured. In particular due to the one-piece basic housing or an in particular two-piece tubular housing of the check valve, which is preferably cartridge-shaped, this check valve can also be inserted as a unit into a tube or a through-opening, such that no additional interface is required.

According to an alternative embodiment of the check valve, the guide element is designed as a sleeve having a base that is assigned to the discharge opening. The valve closing member has a cylindrical guide section which preferably surrounds the sleeve. Alternatively, the guide section can also engage in the sleeve and be guided into it. In particular, the base is oriented towards the discharge opening and the sleeve extends towards the feed opening. This allows a simple arrangement and guidance of the valve closing member relative to the guide element.

Preferably, it is provided that the base of the guide element has at least one, preferably three, slot-shaped apertures which are connected to one another. Within the guide section of the valve closing member and the guide element, at least one guide rod is formed, which extends through the at least one aperture in the base of the guide element and is guided in the at least one aperture in the base. Thus, an additional guidance of the valve closing member to the basic housing can be provided.

Preferably, it is provided that the at least one guide rod has at least one, preferably radially, outwardly directed blocking element, which counteracts the energy storage element and which acts between the basic housing and the valve closing member. The valve closing member can thus be fixed in an initial position. This design allows a simple construction of the check valve, which consists of the basic housing and the valve closing member, wherein the valve closing member can be positioned in an initial position by the at least one guide rod in a latching manner to the basic housing. Thus a manageable unit can be created as a check valve.

Furthermore, it is preferably provided that the at least one, preferably the three, spaced-apart guide rods can be moved towards one another, which are preferably aligned in a star shape relative to one another, to pass through the aperture on the base and subsequently to block a disengagement of the valve closing member to the basic housing. This allows a simple assembly of the valve closing member with the interposition of the energy storage element to the basic housing.

The aperture in the basic housing consists of at least one, preferably three, oblong openings, which are aligned with a longitudinal central axis of the basic housing and merge with one another in the area of the longitudinal central axis. Thus a simple passage of the guide bars for assembling and fixing the valve closing member to the basic housing is enabled. At the same time, the energy storage element can be held between the basic housing and the valve closing member.

A preferred design provides that the energy storage element is provided coaxially to the at least one guide rod and surrounds this/these. In this way, an additional guide of the energy storage element can be provided.

Preferably it is provided that the energy storage element is arranged between the basic housing and the valve closing member in a pre-tensioned manner. With regard to the spring constant and/or length, the energy storage element is designed and adapted to the installation conditions of the basic housing and the valve closing element. In this way, the pre-tensioning force can also be determined. The energy storage element is pre-tensioned by the assembly of the valve closing element to the housing. In this way, an opening time or an opening pressure for the valve closing element can be set. The pre-tensioning also increases the restoring force, which also allows a faster closing process of the check valve.

Furthermore, the guide section of the valve closing member is preferably guided on the guide element through at least one guide rib. This at least one guide rib can be arranged between the guide section of the valve closing member and the guide element. Alternatively, the at least one guide rib can also be provided inside the guide element, i.e. on an inside of the sleeve, in order to guide the valve closing member.

A further advantageous design of the check valve provides that the guide element is positioned in the flow channel of the base body by the at least one longitudinal rib. By way of example, three longitudinal ribs aligned with one another in a star shape or several longitudinal ribs can be provided to receive the guide element at the centre of the basic body. These longitudinal ribs can be designed as bars which extend radially outwards from the guide element.

The valve closing member advantageously has a spherical or projectile-shaped closing body, which has the access opening and closes the valve seat, which is preferably in a valve housing, which can be attached on the basic housing or is provided on the connection device. The guide section connects, preferably continuously, to the closing body downstream or aligned with the discharge opening. In this way, a geometry favourable to the flow can be created to prevent flow losses or turbulence when the refrigerant passes through the flow channel when the valve is open.

A further advantageous design of the check valve provides a recess in an outer circumference of the closing body of the valve closing member, in which a sealing element, in particular an O-ring seal, is provided. In this way, a sealing effect can additionally be provided in a closing position or initial position of the valve closing member relative to the valve seat.

In the arrangement of the closing body of the valve closing member in its initial position or closing position, it is preferably provided that the outer surface of the closing body of the valve closing member is in positive contact with the valve seat, and the sealing element downstream in the direction of flow only acts on the valve seat in a sealing manner. This arrangement has the advantage that the closing body absorbs the actual closing force through the energy storage element and rests on the valve seat, whereas the sealing element only has a sealing effect without this sealing element absorbing the closing force. In this way, a long-lasting effect can be achieved.

Furthermore, it is preferably provided that the basic housing has a, preferably detachable, connection interface that points in the direction of the valve closing member and can be connected to a valve housing. This simplifies the assembly of the energy storage element and the valve closing member onto the base frame.

The valve seat on the valve housing or on the connection device is preferably formed by a nozzle-shaped cross-sectional constriction. In this way, a streamlined course without tear-off edges is formed.

Furthermore, the valve housing preferably has a constriction in which a sealing element is provided. The constriction preferably adjoins an outer, in particular frontal, annular collar of the valve housing. On the one hand, the annular collar can provide a defined positioning of the check valve in a connection point or in a tube. Furthermore, the seal arranged adjacently to the ring collar enables a seal between the valve housing and an inner surface of the connection point, such that the medium exclusively flows through the check valve.

The detachable interface between the valve housing and the basic housing can be designed as a latch, snap, plug, press or screw connection. Preferably, all connections are to be designed in such a way that they are media-tight.

Advantageously, the interface is provided in a cylindrical or conical section of the basic housing. In this way, the interface is arranged in the region of a larger diameter and thus its manufacture is simplified.

Furthermore, a connection section of the valve housing is preferably provided internally or externally to the connection section of the basic housing. If a pressure is applied to this interface by the medium which flows through the flow channel, this arrangement will additionally create a positive connection between the two adjacent connection sections, in particular with a latch or snap connection.

A further advantageous design of the invention provides that the base body is designed in a cage-like manner. This enables a further cross-section reduction in the design of the check valve, since the radial installation volume of the basic housing can be reduced at least by the wall thickness of the basic housing.

Advantageously, at least the valve housing and/or the basic housing and/or the valve closing member is manufactured from a one-component or two-component plastic or a plastic-elastomer combination. The plastic can be selected depending on the medium. By way of example, polypropylene, polyethylene, polyurethane, ABS or similar can be provided. The geometries of the valve housing, the basic housing and the valve closing member are selected in such a way that they can be manufactured as simple injection moulded parts.

A further preferred design of the check valve provides that the smallest opening of the connection opening of the connection device or the valve housing has a ratio to the total length of the check valve of from 0.2 to 4.

Furthermore, it is preferably provided that the smallest opening diameter of the connection opening of the connection device or the valve housing has a ratio to the outer diameter of the check valve of from 1 to 2.5.

A further preferred design of the check valve provides that the largest outer diameter of the valve closing member relative to the length of the valve closing member is in a range of from 0.3 to 3.

According to a further preferred design of the check valve, it is provided that the valve closing member is guided in an initial position and in a first opening phase by the at least one guide rod in the guide element and by at least one guide rib which is oriented on the closing body of the valve closing member in the opposite direction to the at least one guide element, said guide rib engaging in the connection opening of the connection device or the valve housing. In a second opening phase up to the working position of the valve closing member, the valve closing member is preferably guided by the at least one guide rod in the guide element and by a guide section on the valve closing member partially surrounding the at least one guide rod and a sleeve on the guide element. By means of such an arrangement, a sequential guidance of the valve closing member in the basic housing and valve housing can be made possible. In this way, a secure guidance of the valve closing member between the initial position and the working position can be achieved, also with regard to the medium flowing through. Disruptive transverse movements of the valve closing element, in particular when transferring to a working position, can be minimised or prevented.

A further advantageous design of the check valve according to the second alternative provides that, in the working position of the valve closing member, the energy storage element through the guide section and the sleeve mesh in such a way that the energy storage element is shielded from the flow channel. Thus the guide between the at least one guide rod and the guide element can be protected against contamination by particles.

Preferably, an axially moveable seal is provided between the guide section of the valve closing member and the sleeve of the guide element according to the second alternative. This has the advantage that the interior of the sleeve and the guide section of the valve closing member is sealed against the flow channel, which flows around the valve closing member with the cylindrical guide section and the sleeve on the outside.

Advantageously, the energy storage element is arranged in the guide section of the valve closing member and the sleeve of the guide element. The base of the guide element is preferably closed. In this way, the energy storage element does not come into contact with the medium which flows through the check valve. In particular, the energy storage element is separated from the medium in the sealing arrangement of the guide section of the valve closing member to the sleeve of the guide element. In this way, the service life of the energy storage element can be increased even in the event that aggressive media flow through the check valve. In addition, a constant response behaviour of the energy storage element is provided, since a temperature influence of the medium on the energy storage element is almost non-existent.

Alternatively, the energy storage element can be arranged outside the guide section of the valve closing member and outside the guide element of the sleeve.

The check valve according to one of the above-mentioned embodiments can be inserted into an outlet opening of a second through-bore of a connecting device for an internal heat exchange. Thus the check valve can be inserted into the connection device or an inner tube of the heat exchanger before the inner heat exchanger is installed, such that an additional interface and thus leakage point does not exist.

A further use of the check valve according to one of the embodiments described above provides that the check valve can be inserted into an inner tube of an internal heat exchanger consisting of the inner tube and an outer tube surrounding the inner tube.

A further use of the check valve, which is designed according to one of the embodiments described above, can be in a connecting flange of a collector, in particular of a refrigerant collector.

The invention and further advantageous embodiments and developments of the same are described and explained in more detail below using the examples depicted in the drawings. The features to be taken from the description and the drawings can be applied individually or with each other in any combination in accordance with the invention. Here are shown:

Figure 1:
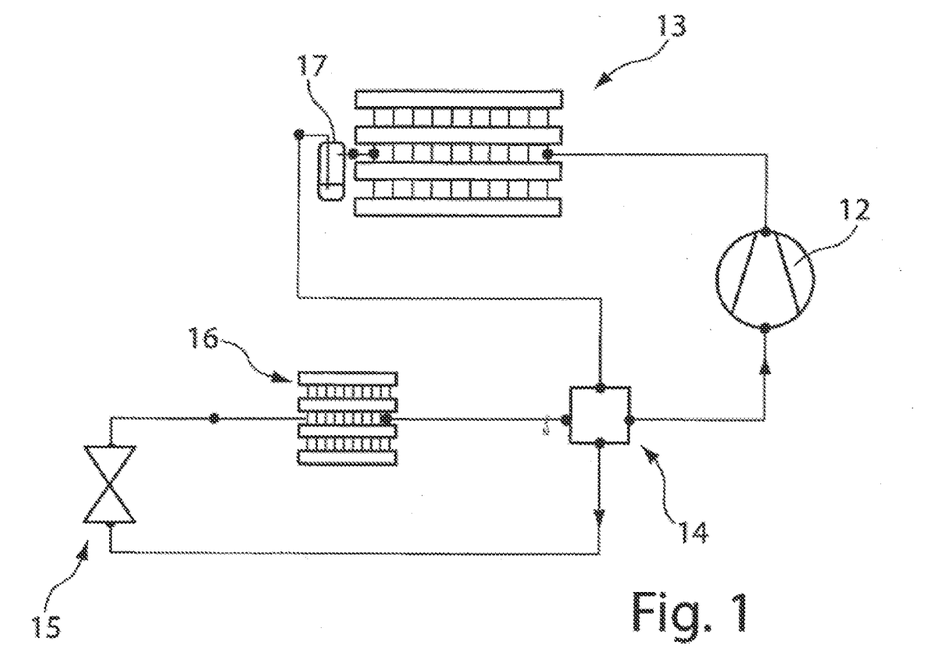
FIG. 1 a schematic depiction of a cooling circuit.

FIG. 1 shows a conventional design of a cooling or heating circuit 11, in particular an air conditioning system, which is preferably used in motor vehicles. A refrigerant is compressed in a compressor 12. This can be, for example, R134A, R1234yf or $CO_2$. The compressed refrigerant is fed to a condenser 13, wherein a heat exchange between the compressed refrigerant and the environment takes place to cool the refrigerant. Downstream of the condenser 13, an accumulator 17 or collector can be provided to separate the refrigerant from the gas phase and the liquid phase and to collect liquid refrigerant at the same time. The refrigerant leaving the condenser 13 or accumulator 17 reaches an inner heat exchanger 14. An expansion valve 15 is provided between the internal heat exchanger 14 and a heat exchanger 16. The expansion valve 15 controls the mass flow of the cooling or heating circuit 11 depending on the existing pressure difference. The refrigerant under high pressure is expanded by the expansion valve 15 and reaches the heat exchanger 16 on the low-pressure side. From the heat exchanger 16, the refrigerant absorbs heat from the surroundings. From there, the refrigerant is fed back to the compressor 12 via the inner heat exchanger.

When using a connection device 21, described below, according to FIG. 2 in such a cooling circuit, there is a deviation in the construction of the cooling circuit 11 according to FIG. 2 in such a way that the expansion valve 15 is not separately arranged in a tube section between the inner heat exchanger 14 and the heat exchanger 16, but rather is integrated into a connection block 22, for example.

Figure 2:
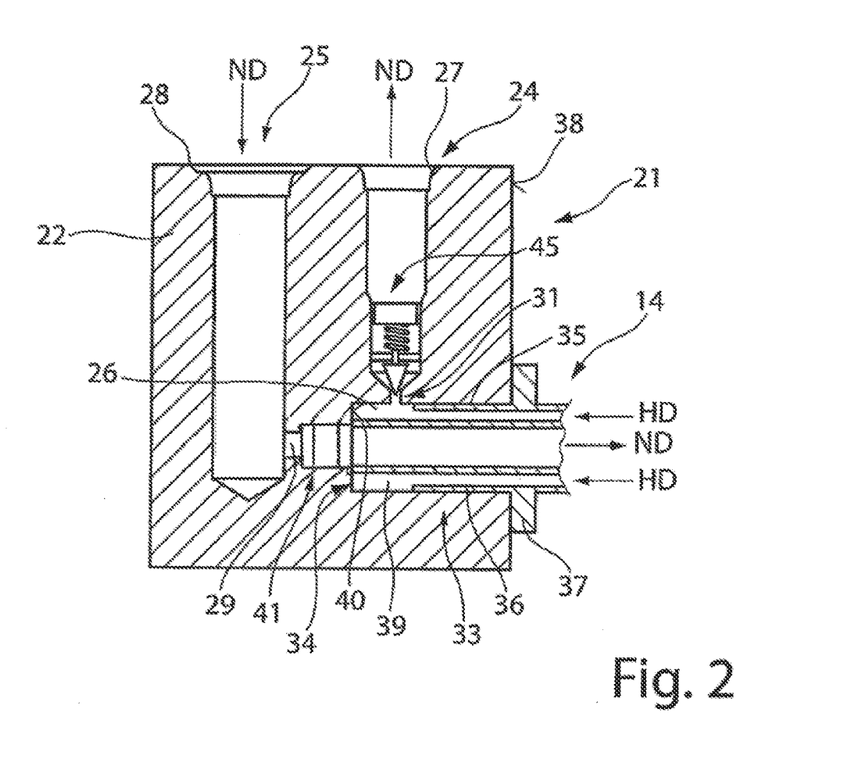
FIG. 2 a schematic sectional view of a connecting device having a check valve, FIG. 3 a schematically enlarged sectional view of the check valve, FIG. 4 a schematic sectional view along the line in FIG. 3, and FIG. 5 a perspective view of an alternative embodiment of the check valve to FIG. 3, FIG. 6 a schematic sectional view of the check valve according to FIG. 5, FIG. 7 a view of a basic housing of the check valve according to FIG. 5, FIG. 8 a schematic sectional view of the check valve according to FIG. 5 in a first installation situation, FIG. 9 a schematic sectional view of the check valve according to FIG. 5 having a valve housing in a further installation situation, FIG. 10 a perspective view of a connection opening of an alternative embodiment of a check valve, FIG. 11 a perspective rear view of the check valve according to FIG. 10, FIG. 12 a schematic sectional view of the alternative embodiment of the check valve according to FIG. 10 in an initial position, and FIG. 13 a schematic sectional view of the alternative embodiment of the check valve according to FIG. 10 in a working position.

The connection device 21 according to FIG. 2 comprises an inlet opening 26 of a first through-bore 24, which leads to an outlet opening 27 via a throttle point 35. This outlet opening 27 is connected to an inlet of the heat exchanger 16. Adjacent to this, a second through-bore 25 is provided in the connection device 21. An inlet opening 28, which is connected to an outlet of the heat exchanger 16, receives the refrigerant coming from the heat exchanger 14 and feeds it to an outlet opening 29 of the second through-bore. The inlet opening 26 of the first through-bore 24 and the outlet opening 29 of the second through-bore 25 are provided in a common connection bore 33. An end section of an inner heat exchanger 14 can be inserted into this common connection bore 33. This inner heat exchanger 14 has an outer tube 36, the outer circumference of which abuts the bore section 35 of the connection bore 33 and extends at least partially into the connection bore 33. In the outer tube 36, a ring collar 37 or a flange or another connection point is preferably provided, which abuts the connection block 22 and fixes the inner heat exchanger 14 to the connection block 22.

The outer tube 36 of the inner heat exchanger 14 extends near or up to the cross-sectional constriction 31 without covering it. An inner tube 39 of the inner heat exchanger 14 protrudes from the outer tube 36 and preferably abuts an end face 40, which is formed in the transition area 34 between the outlet opening 29 and the bore section 35. By means of such an arrangement, the inlet opening 26 of the first through-bore 24 is formed by an annular channel between the inner tube 39 and the bore section 35 of the connection bore 33.

In this connection device 21, the cross-sectional constriction 31, viewed in the direction of flow of the refrigerant, is followed by an expansion valve 45, for example.

A check valve 41 can be inserted in the outlet opening 29 of the second through-bore 25 of the connection block 22. Alternatively, a check valve 41 can also be inserted into an end of the inner tube 39 of the inner heat exchanger 14. In both cases, the check valve 41 abuts the front surface 40 or is arranged adjacent to it. An additional interface is not formed by this.

Figures 3, 4:
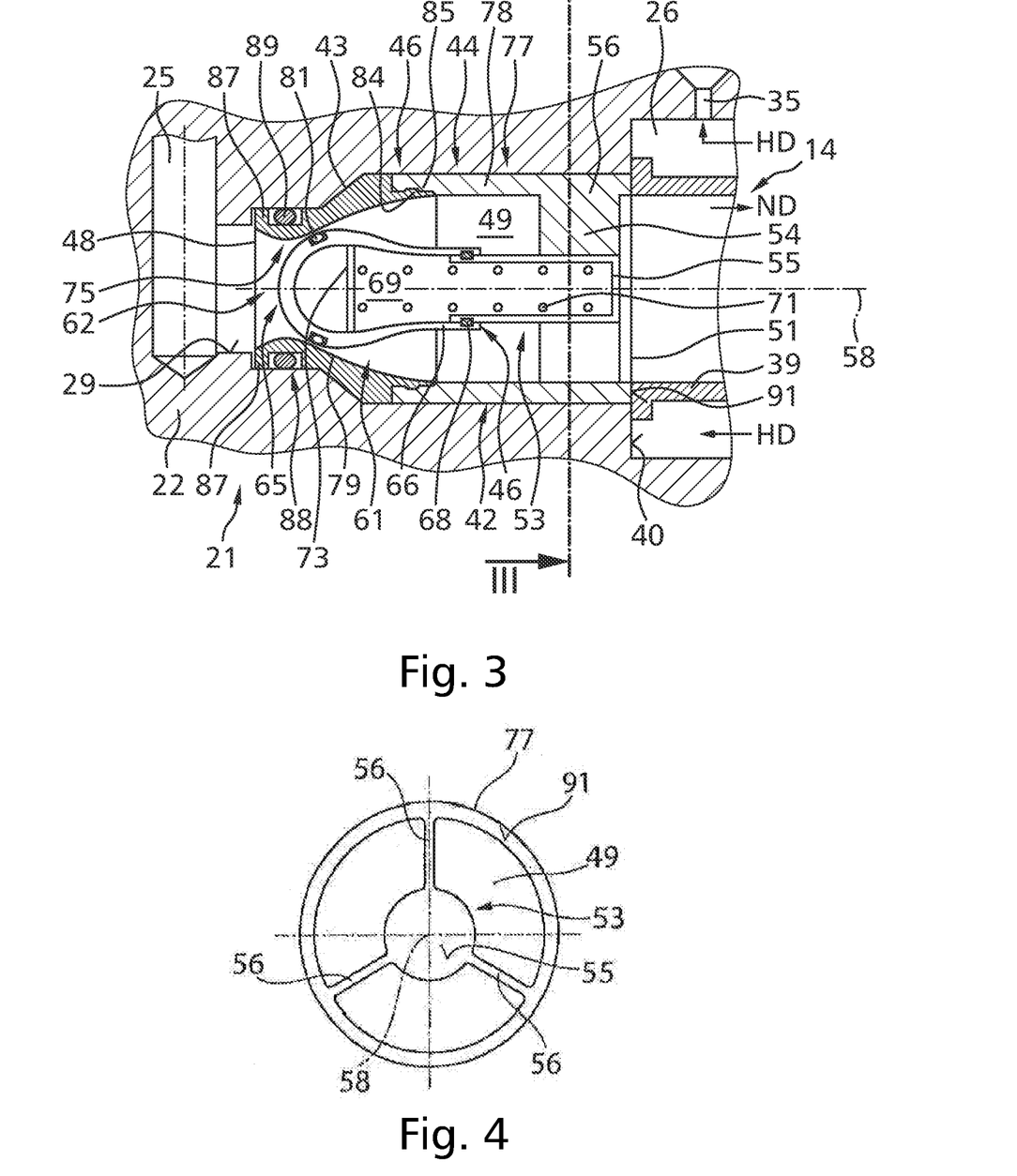

In FIG. 3, a schematically enlarged view of the check valve 41 is depicted, which, for example, is inserted into the outlet opening 29 of the second through-bore 25 of the connection block 22. It is understood that this check valve 41 can also be inserted into any other opening cross-section that is provided for the supply and flow of a medium.

The flow direction of the medium is in front of the inlet opening 28 of the second through-bore 25 through the outlet opening 29 into the inner heat exchanger 14, in particular the inner tube 39.

The check valve 41 comprises a housing 42, which is formed in two parts in the exemplary embodiment. Alternatively, this can also be designed in several parts. The housing 42 consists of a valve housing 43 and a basic housing 44, which are connected to each other via a common interface 46. A feed opening 48 is provided on the valve housing 43, said feed opening being connected by a flow channel 49 in the housing 42 to a discharge opening 51 on the basic housing 44. A guide element 53 is provided in the basic housing 44 near the discharge opening 51. This guide element 53 consists of a sleeve 54 with a base 55, which is oriented towards the discharge opening 51. The guide element 53 is oriented towards the longitudinal central axis 58 of the housing 42 by means of longitudinal ribs 56 or webs.

FIG. 4 depicts a schematic sectional view along the line in FIG. 3. This sectional view shows the exemplary alignment and arrangement of the longitudinal ribs 56 between the basic housing 44 and the guide element 53. At least three longitudinal ribs 56, preferably aligned at the same distance from one another, can be used to create a rigid arrangement and accommodation of the guide element 53 in the basic housing 44.

Furthermore, as shown in FIG. 3 in the sectional view, the guide element 53 has an open end which is oriented towards the feed opening 48. A valve closing member 61 is displaceably provided on the guide element 53. FIG. 3 depicts the valve closing member 61 in an initial position 62 or closing position. In the case of a displacement movement of the valve closing member 61 in the direction of the discharge opening 51, it is transferred to a working position, whereby the flow channel 49 is opened depending on the displacement movement of the valve closing member 61.

In this exemplary embodiment, the valve closing member 61 comprises a spherical or cartridge-shaped closing body 65, to which a guide section 66 attaches, oriented in the direction of the discharge opening 51. This guide section 66 surrounds the sleeve 54. Preferably, guide ribs can be between the guide section 66 and the sleeve 54. In particular, an axially displaceable seal 68 can be provided between the guide section 66 and the sleeve 54. This axially displaceable seal 68 can be designed as a sealing ring with a rectangular cross-section, for example.

By positioning the valve closing member 61 in relation to the guide element 53, an interior space 69 is created within the guide section 66 and the sleeve 54, which is sealed off from a medium flowing through the flow channel 49. An energy storage element 71 is arranged in this interior space 69. This energy storage element 71 is supported on the one side on the base 55 of the guide element 53 and on the other side on a support surface 73 on the closing body 65 of the valve closing member 61. Thus, this energy storage element 71 can be operated substantially without influencing the medium flowing through the check valve 41. In addition, an almost turbulence-free flow channel 49 is created, since the energy storage element 71, which is in particular designed as a spiral or compression spring, does not extend within the flow channel 49. At the same time, by overlapping the guide section 66 of the valve closing member 61 with the guide element 53, a flow-favourable arrangement can be created.

The valve housing 43 comprises the feed opening 48, which is designed to be smaller in the flow cross-section than the discharge opening 51 on the basic housing 44. Starting from the feed opening 48 of the valve housing 43, an increasing constriction or narrowing of the flow cross-section occurs to form a valve seat 75. Subsequently, the flow channel 49 expands within the valve housing 43 and opens into a cylindrical section 77 in the basic housing 44. In the initial position 62 of the valve closing member 61, the closing body 65 abuts the valve seat 75. The force acting on the closing body 65 by the energy storage element 71 is counteracted by the valve seat 75. The closing body 65 has a ring-shaped recess 79 downstream of the valve seat 75, in which a sealing element 81, in particular an O-ring seal, is inserted. In the initial position 62 of the valve closing member 61 relative to the valve seat 75, this sealing element 81 has a sealing effect. The sealing element 81 is thus in sealing contact, wherein the closing force is absorbed by the energy storage element 71 through the closing body 65 attached in the valve seat 75.

The interface 46 between the valve housing 43 and the basic housing 44 is designed as a latch connection according to the depicted embodiment in FIG. 3. A connection section 84 of the valve housing 43 is formed on the interior of the connection section 85 of the basic housing 44. This has the advantage that, due to the pressure forces in the flow channel 49, which also act radially, the connection section 84 of the valve housing 43 is pressed against the connection section 85 of the basic housing 44, whereby the form closure is increased, since the inner wall of the outlet opening 29 forms a rigid counter-bearing. Thus an additional sealing effect can be created at this interface 46.

For sealing between the housing 42 of the check valve 41 and the outlet opening 29 of the connection block 22 or another tube, a constriction 88 is provided on an outer circumference of the valve housing 43. This serves to accommodate a sealing element 89 to achieve a seal.

Furthermore, a ring collar 87 is connected to the constriction 88. This serves for the defined contact and positioning of the check valve relative to the installation location.

The check valve 41, for example, is held in place by the inner tube 49 of the heat exchanger 14 in the connection opening 29. The inner tube 49 can directly engage with its front side on a front side 91 of the basic housing 44. Preferably, an inner diameter of the cylindrical section 77 of the basic housing 44 is adapted to the inner cross-section of the inner tube 49 of the inner heat exchanger 14 or vice versa, such that a continuous transition can preferably be created.

In cases in which the diameter of the inner tube 39 is smaller than the cylindrical section 77 of the basic housing 44, it can be provided that the cylindrical section 77 of the basic housing 44 tapers towards the discharge opening 51 and the discharge opening 51 in the cross-section corresponds to the inner cross-section of the inner tube 39 or a further connection element.

Preferably, a continuous transition from the basic housing 44 to the adjacent connecting element, such as the inner tube 39 of the inner heat exchanger 14, is provided. If the diameter of the connection element is smaller than the diameter of the cylindrical section 77 of the basic housing 44, the guide element 53 can be at a greater distance from the discharge opening 51, i.e. the base 55 is offset towards the feed opening 48, such that a sufficiently large flow cross-section of the flow channel 59 is maintained when an end section of the basic housing 44 is tapered.

The check valve 41 according to the exemplary embodiment consists of three components, which can in particular be manufactured cost-effectively by means of an injection moulding process. These are the basic housing 44 with the guide element 53 preferably provided in one part on it, the valve closing member 61 and the valve housing 43. To complete the check valve 41, the energy storage element 71 and an axially displaceable seal 68, as well as the sealing element 81, are provided on the closing body 65 of the valve closing member and the sealing element 89 on the valve housing 43. Thus a constructively simple design of such a check valve 41 is provided.

This check valve 41 is also easy to install. The energy storage element 71 is inserted into the guide element 53 of the basic housing 44. Subsequently, the valve closing member 61, if a seal 68 is provided, is positioned in relation to the guide element 53 with the interposition of the axial seal 68. The sealing element 81 is preferably attached to the closing body 65 before positioning the valve closing member 61 on the guide element 53. This can also take place afterwards. Subsequently, the valve housing 43 is oriented towards the basic housing 44 and these are connected to each other by the interface 46. When designing the interface 46 as a latch connection, plugging in suffices. In addition, the sealing element 89 is positioned relative to the ring collar 87 on the valve housing 43 or in the constriction 88. The check valve 41 is then ready for installation.

Figure 5:
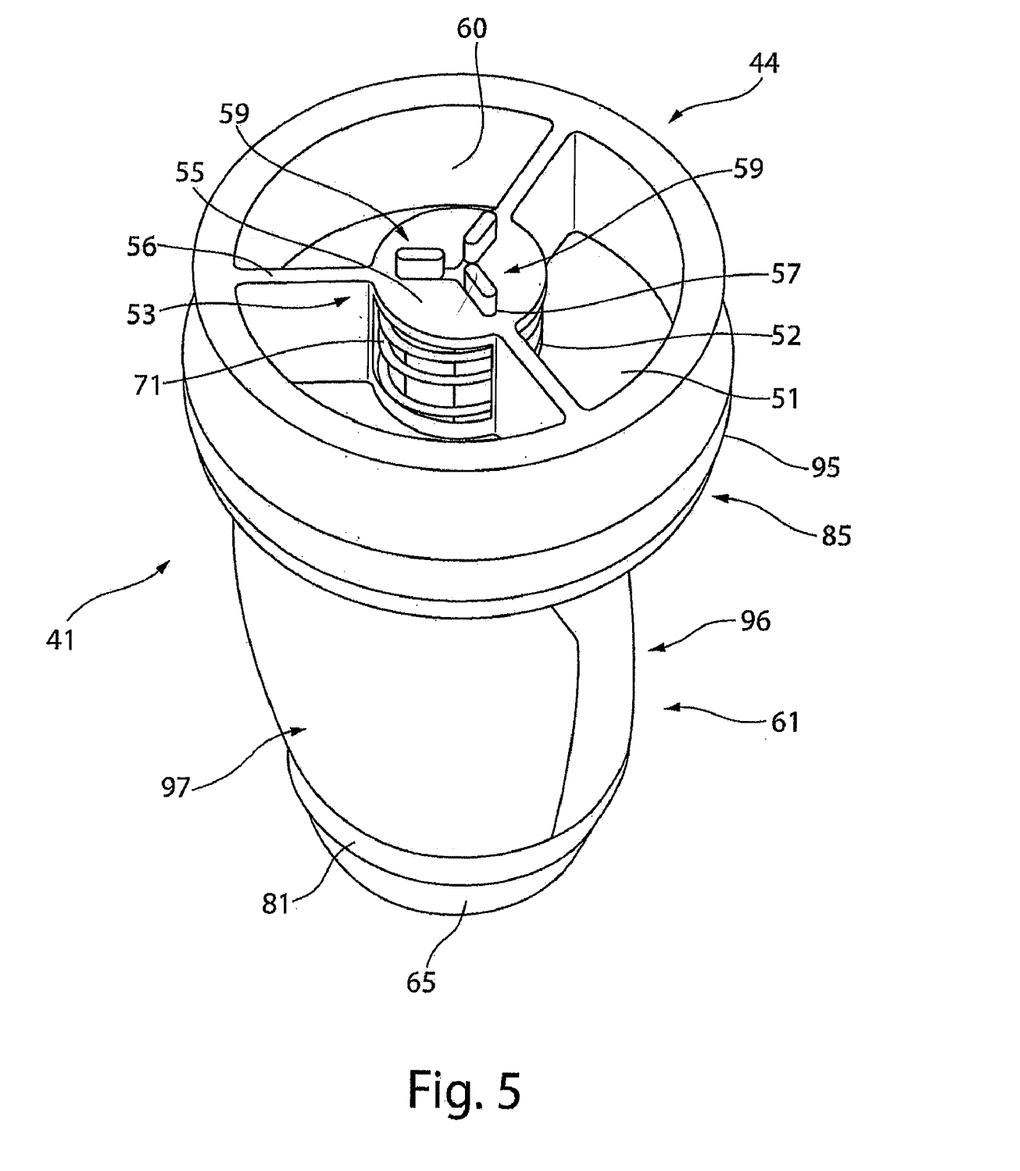
Figure 6:
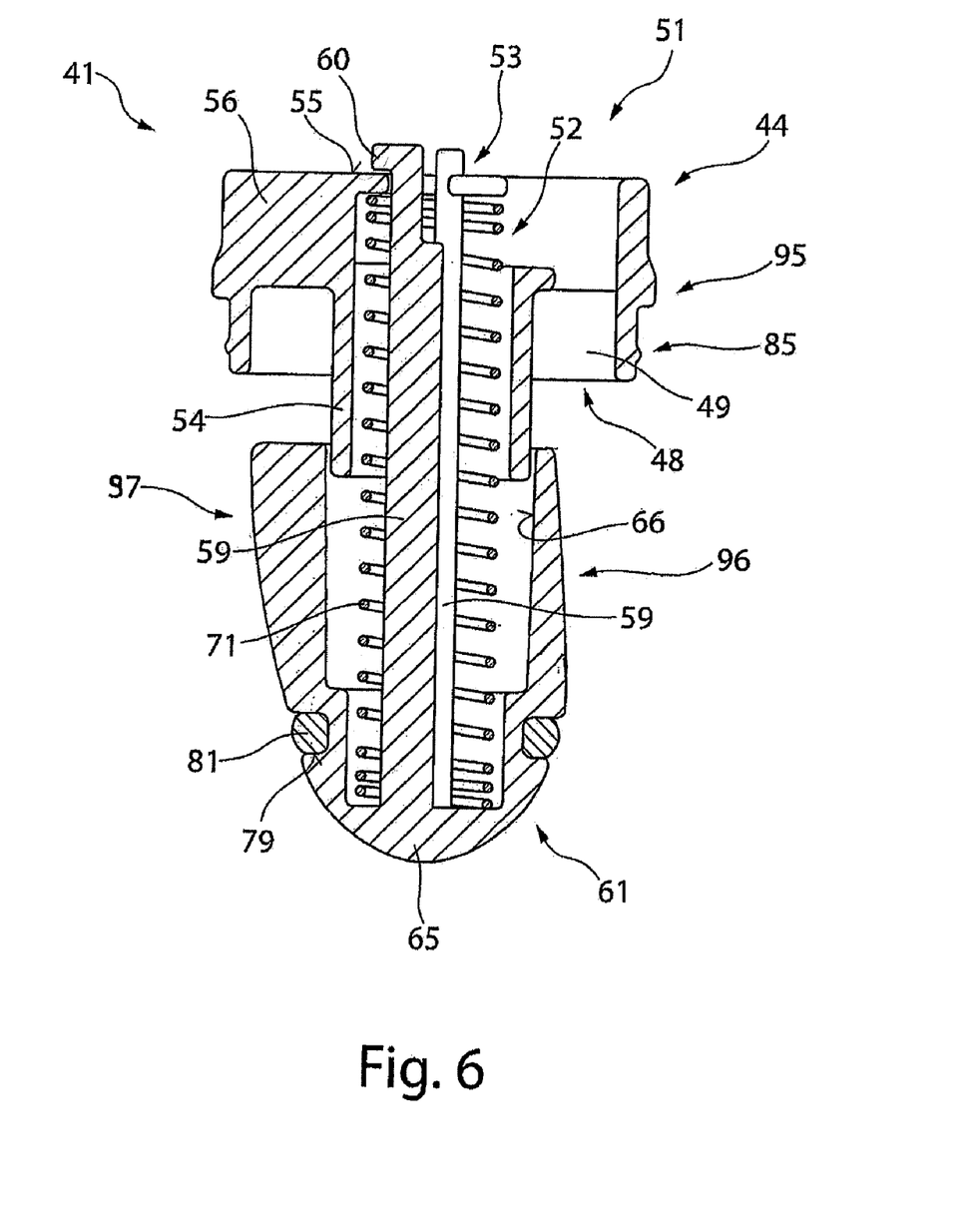

FIG. 5 depicts an alternative embodiment of the check valve 41 to FIG. 3. FIG. 6 shows a schematic sectional view of the check valve 41 according to FIG. 5. If the components are structurally identical, reference is made to FIGS. 3 and 4.

Figure 7:
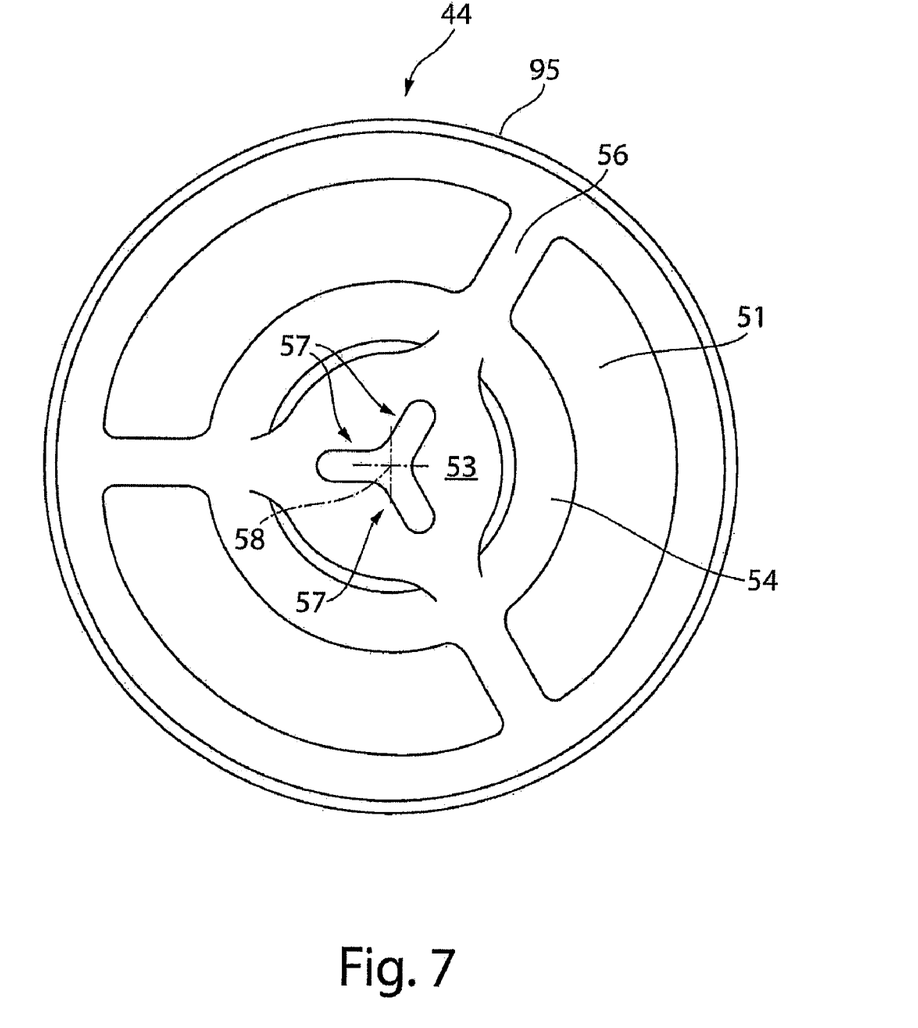

This check valve 41 comprises a basic housing 44, which is ring-shaped. In the central area of the basic housing 44, the guide element 53 is provided. This is accommodated, for example, by at least one longitudinal rib 56, preferably by three longitudinal ribs 56. This guide element 53 can comprise a sleeve 54, which is depicted in the sectional view in FIG. 6. Recesses 52 can be provided between the sleeve 54 and the guide element 53. The guide element 53 comprises at least one aperture 57, preferably three apertures 57, which are connected to each other. For a better depiction of the apertures 57 in the guide element 53, a top view is depicted in FIG. 7. The apertures 57 are aligned with one another in a star shape, for example. Preferably, the apertures 57 are in longitudinal extension relative to the longitudinal ribs 56.

Figure 9:
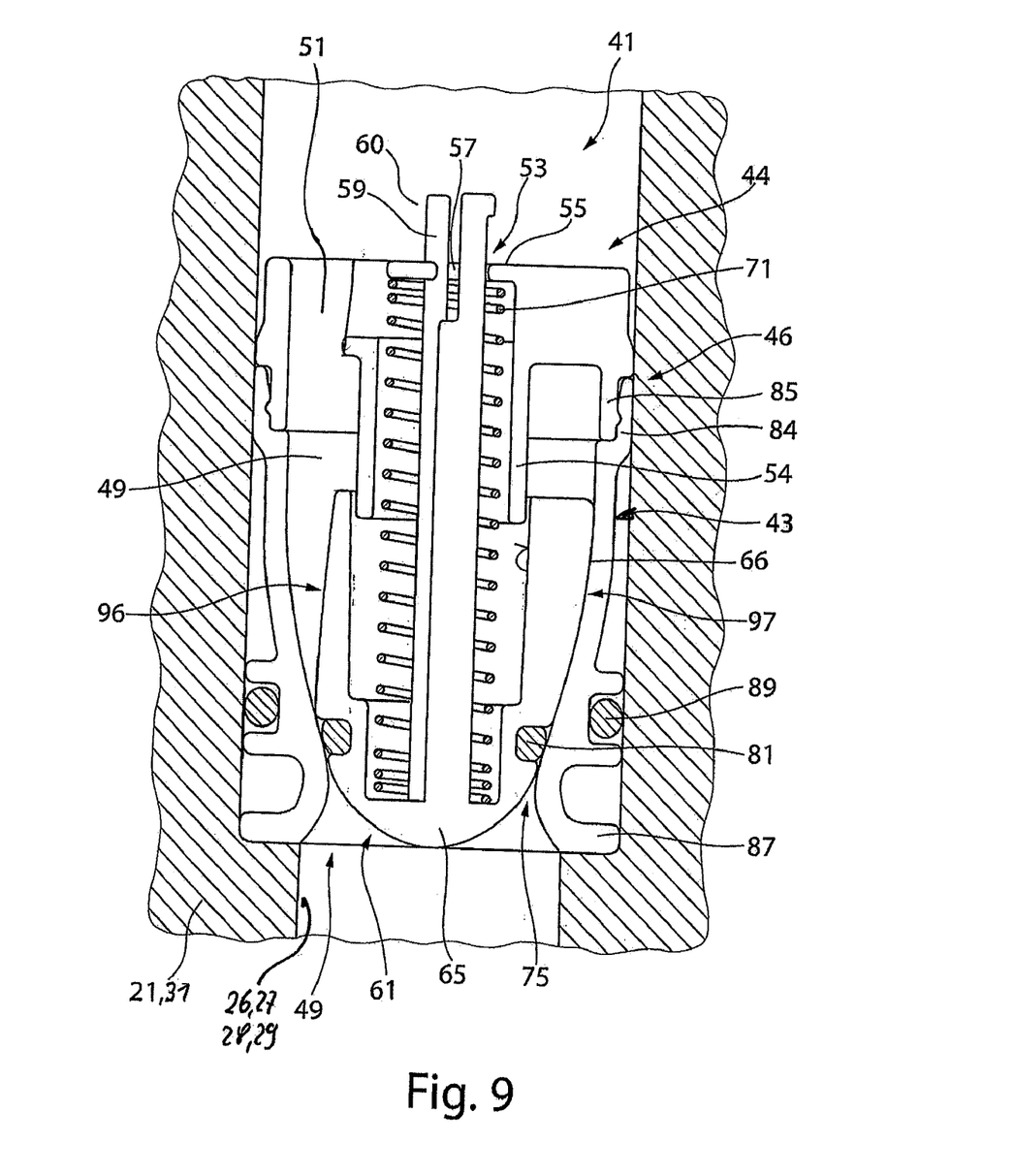
Figure 10:
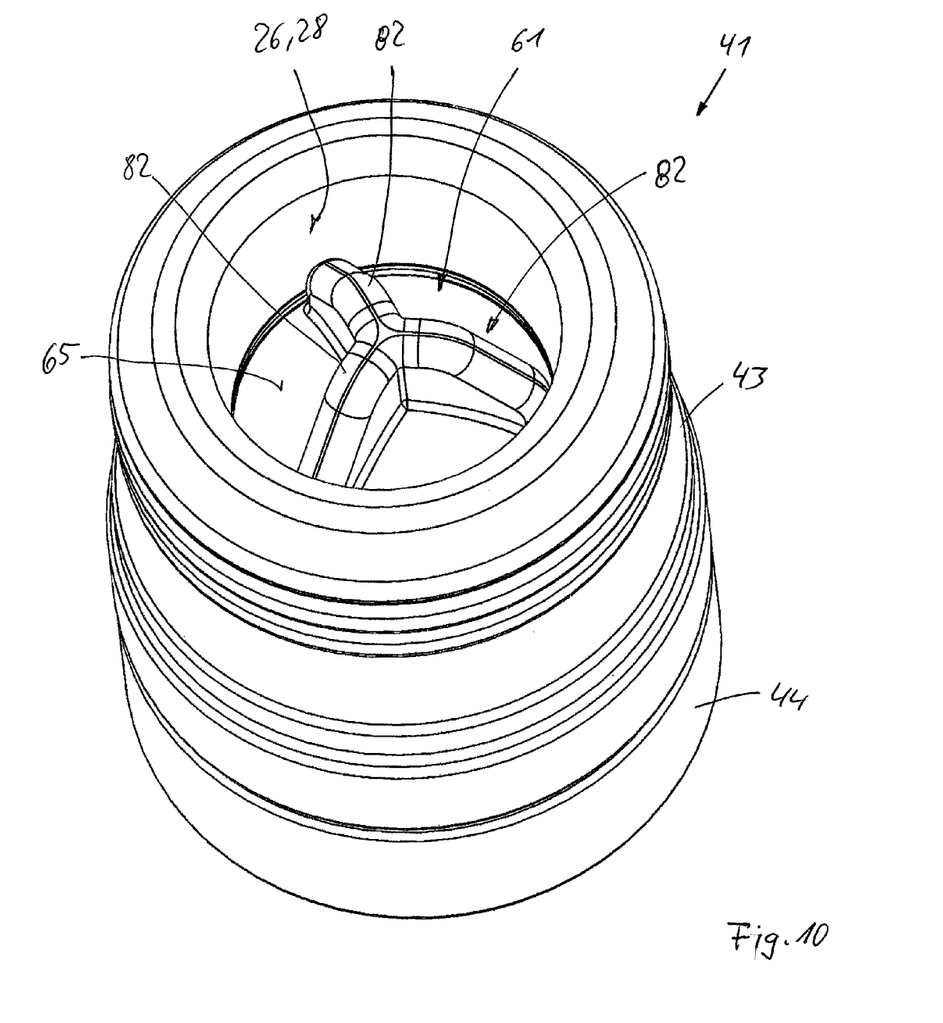
Figure 11:
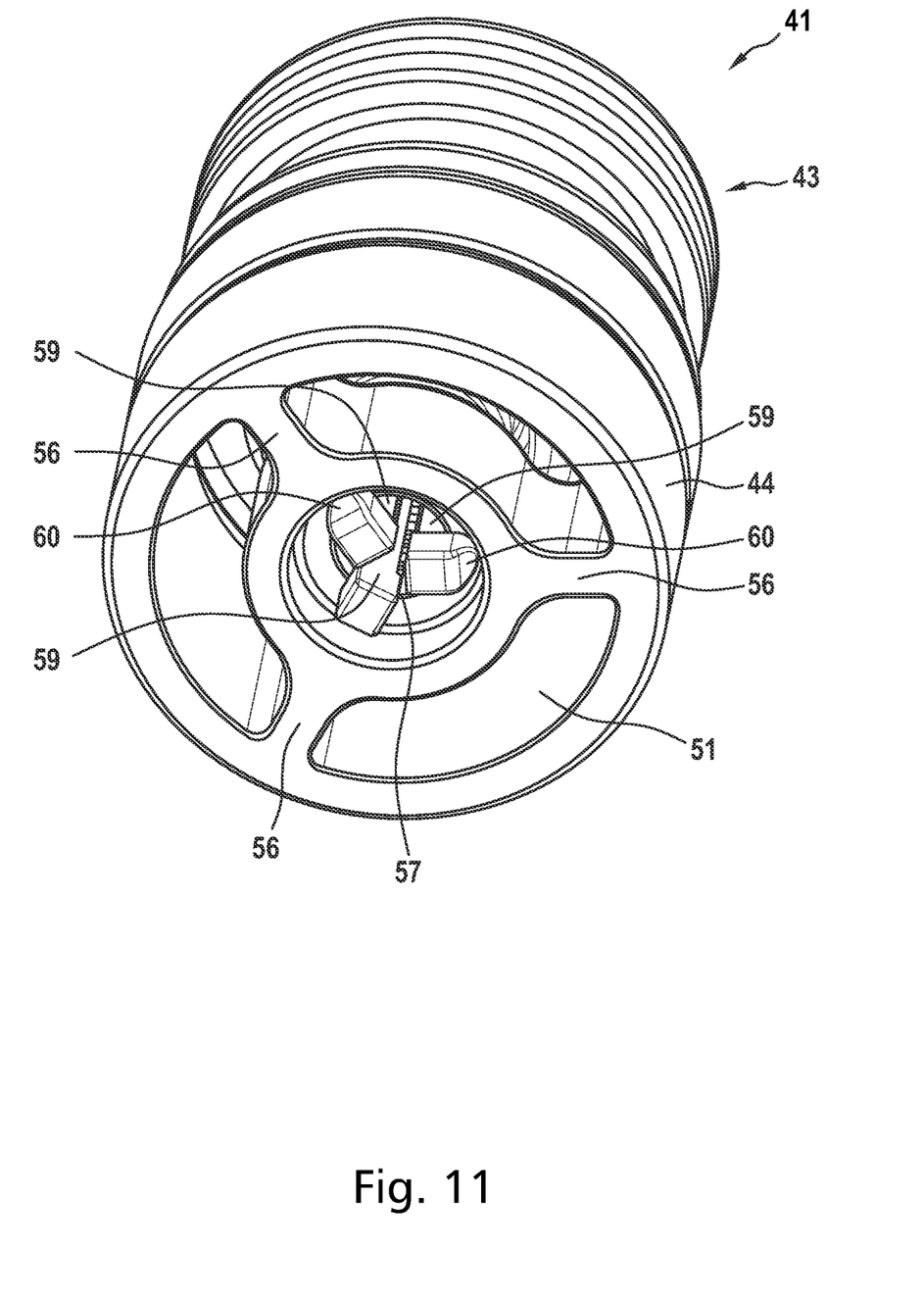

The basic housing 44 can have a peripheral shoulder 95, by means of which a radially outward projection is created. This can serve, for example, as a stop for a defined installation of the check valve 41. The basic housing 44 can also have a connection section 85. This can be used to attach a valve housing 43 having a connection section 84 arranged thereon to the basic housing 44. This arrangement of the valve housing 43 relative to the basic housing 44 is depicted in FIG. 9, for example.

The sectional view according to FIG. 6 shows that at least one guide rod 59 extends inside the valve closing member 61. This guide rod 59 extends from the closing body 65 in the direction of the basic housing 44. A blocking element 60 is provided on the end of the guide rod 59. This blocking element 60 is directed radially outwards. The guide rod 59 has a dimension in the cross-section, such that this is guided in the aperture 57. Advantageously, three guide rods 59 are aligned in a star shape. To connect the valve closing member 61 to the basic housing 44, the guide rods 59 are moved towards each other so that the blocking elements 60 can be guided through the apertures 57. Subsequently, the guide rods 59 return to their initial position. The energy storage element 71 acting between the basic housing 44 and the valve closing member 61 positions the valve closing member 61 in an initial position 62 relative to the basic housing 44. The displacement movement relative to the basic housing 44 of the valve closing member 61 is limited by the respective blocking element 60 of the at least one guide rod 59. This blocking element 60 abuts a guide element 53 on an outer side of the base 55 and limits the displacement movement.

In this initial position 62, the energy storage element 71 can be pre-tensioned between the basic housing 44 and the valve closing member 61. Thus, an opening force of the valve closing member 61 can be adjusted. A faster closing movement from a working position into an initial position 62 can also be achieved.

An axial guide is formed between a guide section 66 of the valve closing member 61 and the sleeve 54 of the guide element 53. Preferably, an axially displaceable seal 68 can be provided between the guide section 66 and the sleeve 54, analogously to the embodiment according to FIG. 3. The valve closing member 61 has a recess 79 adjacent to the valve seat 75, in which the sealing element 81 is arranged. These designs and functions correspond to the embodiment according to FIG. 3 and also apply to this embodiment.

The closing body 65 of the valve closing member 61 can extend asymmetrically in an area between the sealing element 81 and the basic housing 44. By way of example, a one-sided flattening 96 can be provided, which is opposite a curved course 97. The curved course 97 of the closing body 65 can have a course which is favourable to flow. Due to the one-sided flattening 96, an increased flow volume can be achieved. Alternatively, the contour of the closing body 65 in the course can also correspond to the valve closing member 61 according to FIG. 3.

At least one guide rod 59 can be used to provide an additional guide for the internal energy storage element 71. The energy storage element 71 is preferably provided within the sleeve 54 of the guide element 53 and the guide section 66.

Figure 8:
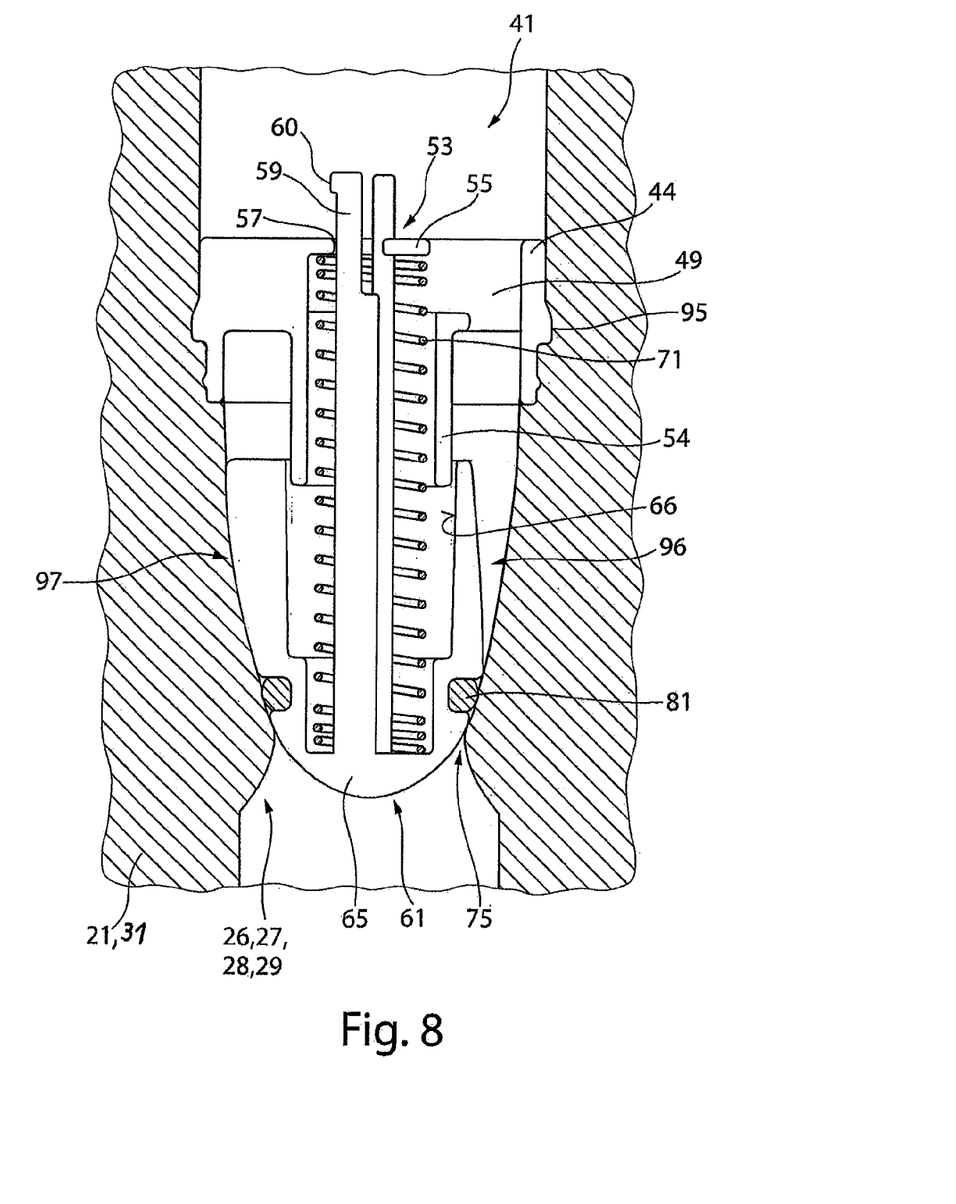

FIG. 8 depicts a schematic view of the check valve 41 according to FIG. 6 in a first installation situation. In this embodiment, a connection opening of the connection device 21 or a tube 39 is depicted. The connection opening can be an outlet opening and/or inlet opening 26, 27, 28, 29.

The basic housing 44 abuts a step in the connection opening of the connection device 21 with the shoulder 95. Thus the check valve 41 occupies a defined position within the connection opening. The check valve element 41 can be installed with a defined pre-tension force of the energy storage element 71. In this case, the energy storage element 71 between the valve closing member 61 and the basic housing 44 is subjected to a compressive force and preferably corresponds to the closing force of the valve closing member 61. A valve seat 75 is formed by a narrowing of the connection opening. This valve seat 75 is abutted by the closing body 65 and the seal 81 of the valve closing member 61. In the initial position 62 depicted in FIG. 8, the check valve 41 is closed.

By changing the distance between the valve seat 75 and the basic housing 44 of the check valve 11 in the connection opening of the connection device 21, the pre-tension of the energy storage element 71 can be adjusted.

When pressure is applied to the valve closing member 61 by a medium, the valve closing member 6 is moved in the direction of the basic housing 44, preferably after overcoming the set pre-tensioning force. As a result, the closing body 65 of the valve closing member 61 lifts off the valve seat 75, and the medium can flow in the direction of the basic housing 44 and passes through the at least one flow channel 49 through the discharge opening 51.

FIG. 9 depicts a schematic sectional view of the check valve 41 according to FIG. 6, which also comprises a valve housing 43. The valve housing 43 comprises the connection section 84, which engages with the connection section 85. The connection section 85 is preferably provided to engage externally with the connection section 84. Alternatively, an interchanged arrangement can also be provided. In this connection interface 46, a plug, latch, snap, press or screw connection can be provided. It can be detachable or non-detachable.

The length of valve housing 43 or the distance between the valve seat 75 and the interface 84 or the basic housing 44 can determine a pre-tensioning force acting on the energy storage element 71.

Starting from the basic housing 44, the valve housing 43 has an inner wall section which preferably tapers continuously in cross-section to the valve seat 75 to form a constriction 88. Subsequently, the inner cross-section of the valve housing 43 is increasingly enlarged again.

On the outer periphery of the valve housing 43, a recessed receptacle for a further sealing element 89 is provided to seal the connection point in the connection device 21.

A front-end ring collar 87 of the valve housing 43 abuts a shoulder of the connection device 21. In this way, a defined installation situation of the check valve 41 for the connection opening in the connection device 21 or the tube 39 can be provided.

The function and design of the check valve 41 corresponds to the check valve 41, which is described in FIGS. 5 to 8.

FIGS. 10 to 13 depict a further alternative embodiment of the check valve 41 to the embodiment according to FIG. 9.

This embodiment of the check valve 41 according to FIGS. 10 to 13 comprises a basic housing 44 for accommodating the valve closing member 61 with the guide rods 59, which are guided into the at least one guide element 53, according to FIGS. 5 to 7. Furthermore, the check valve 21 can comprise a valve housing 43, which can be connected to the basic housing 44 by the detachable interface 46. In this regard, reference is made to FIG. 9.

In this alternative embodiment depicted in FIGS. 10 to 13, the design of the closing body 65 of the valve closing member 61 deviates from the embodiment depicted in FIG. 9. A sealing element 81 is also provided on the valve closing member 61, which abuts a valve seat 75 in a sealing manner. This valve seat 75 is preferably designed in the form of a cone, which widens in the direction of flow from the inlet opening 26, 28 to the outlet opening 27, 29. The cross-section of the flow channel 49 is thus enlarged. This has the advantage that the flow velocity of the medium can be reduced with increasing cross-sectional surfaces and thus the flow pressure losses can be reduced.

Guide ribs 82 are provided on the closing body 65 pointing towards the inlet opening 26, 28. These guide ribs 82 are, for example, aligned in a star shape and merge with each other in a longitudinal central axis 58. Starting from the longitudinal central axis 58, the guide ribs 82 have a curved course and merge flush with the closing body 65, wherein guide surfaces 83 are formed in the transition area. These guide surfaces 83 guide the valve closing member 61 in an initial position 62 within the valve seat 75. These guide surfaces 83 also act as a guide in a first opening phase of the valve closing member 61 opposite the valve seat 75, such that an axial guide of the valve closing member 61 is provided during a first opening phase. At the same time, in the initial position 62 of the valve closing member 61 and in a first opening phase, the valve closing member 61 is additionally guided to the guide element 53 by the guide rods 69.

Figure 12:
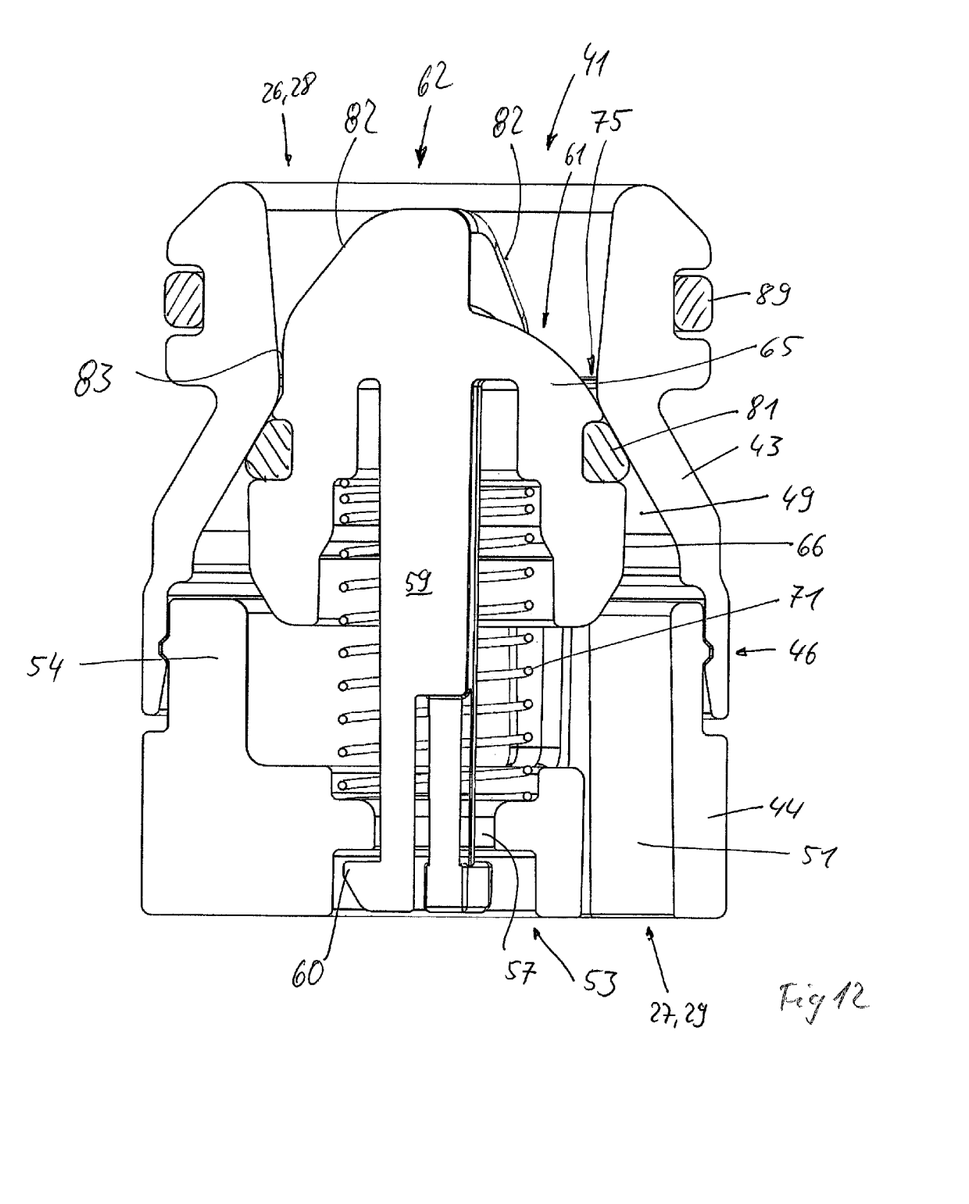
Figure 13:
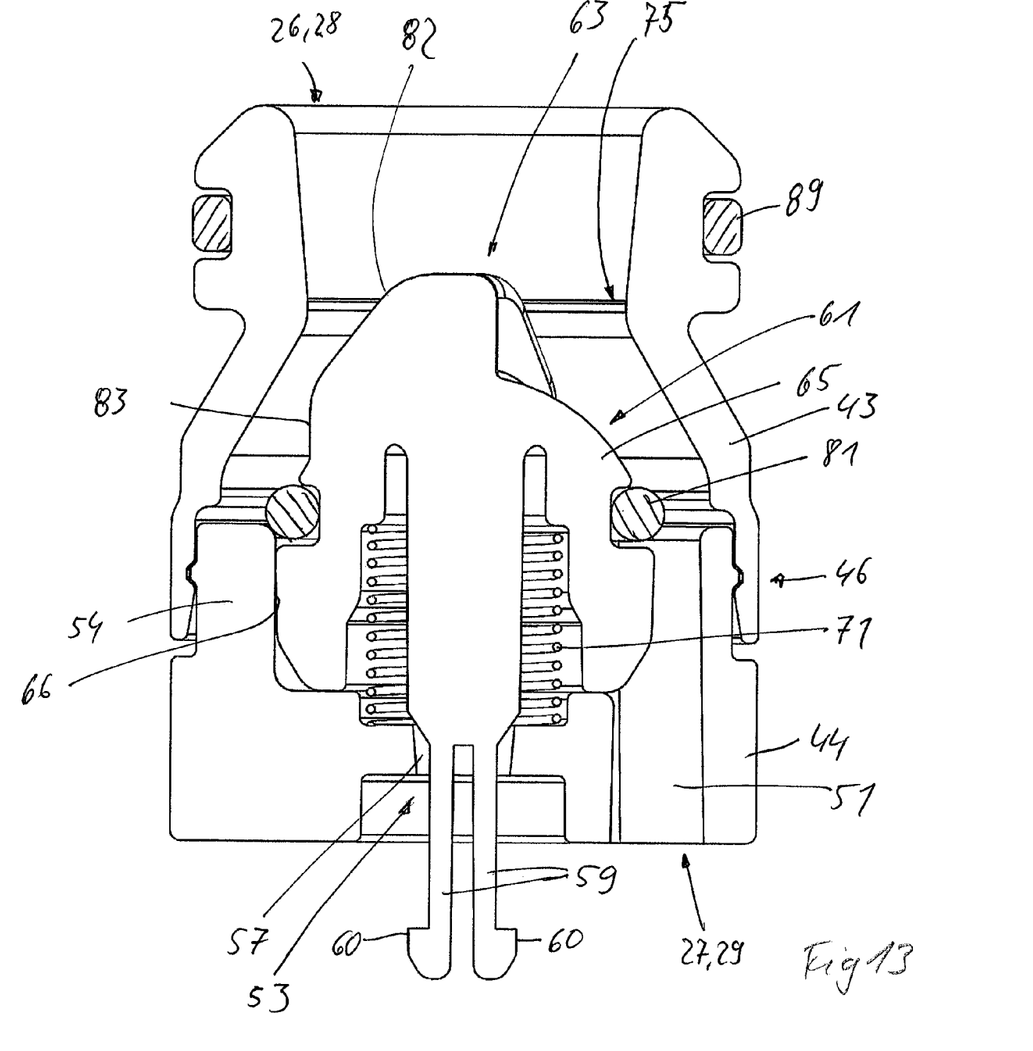

In this alternative embodiment, the guide section 66 and the sleeve 54 do not engage with each other in an initial position 62 of the valve closing member 61. Rather, they are arranged separately from each other. As soon as the guide surfaces 83 of the guide ribs 82 on the closing body 65 detach from the valve seat 75 during the transition from a first opening phase to a second opening phase of the valve closing member 61, the guide section 66 and the sleeve 54 engage with each other and form an axial guide of the valve closing member 61. In a working position of the valve closing member 61 according to FIG. 13, the guide section 66 and the sleeve 54 engage with each other in such a way that the energy storage element 71 is completely enclosed. The flow channel 49 extends outside the valve closing member 61, the guide section 66 and the sleeve 54, such that the flow medium does not come into contact with the energy storage element 71.

The guide ribs 82 provided on the closing body 65 can also have the advantage that these act as so-called rectifiers, i.e. the flow of the medium can be calmed, which in turn enables a reduced flow pressure loss.

With regard to the further design features of the check valve depicted in FIGS. 10 to 13, full reference is made to the above-described embodiments.

The invention claimed is:

1. A check valve, which is insertable into a connection opening of a connection device or a tube,
    having a one-part or multi-part housing, which comprises at least one basic housing, wherein a feed opening is provided on the inlet side and a discharge opening is provided on the outlet side on the basic housing, which are connected to each other by a flow channel,
    having a guide element provided on the basic housing, through which a valve closing member is displaceably guided to the basic housing, wherein the valve closing member is arranged in an initial position by means of an energy storage element, and the valve closing member is displaceable in the direction of the discharge opening against an actuating force of the energy storage element in order to transfer into a working position, and
    the energy storage element is provided between the valve closing member and the basic housing,
    wherein
    the guide element of the basic housing has at least one aperture, and at least one guide rod is guided in this at least one aperture, said at least one guide rod extending from the valve closing member through the at least one aperture and being secured against disengagement from the at least one aperture,
wherein the valve closing member in an initial position and in a first opening phase is guided by the at least one guide rod in the guide element and by at least one guide rib, which is aligned on the closing body of the valve closing member opposite the at least one guide rod, in the connection opening of the connection device or the valve housing, and the guide element is designed as a sleeve having a base, which is assigned to the discharge opening, and the valve closing member has a guide section which engages with the sleeve, and in a second opening phase, is guided to the working position by the at least one guide rod in the guide element and by a guide section surrounding the at least one guide rod on the valve closing member and the sleeve on the guide element.

2. The check valve according to claim 1, wherein the at least one guide rod has at least one, radially, outwardly directed blocking element which counteracts the energy storage element and fixes the valve closing member in an initial position relative to the basic housing.

3. The check valve according to claim 1, wherein the at least one guide rod is provided in order to pass through the at least one aperture on the base and subsequently to block the valve closing member detaching from the basic housing.

4. The check valve according to claim 3, wherein the at least one aperture is formed from at least one web-shaped opening which is aligned with a longitudinal axis of the housing and merge into one another in the area of the longitudinal central axis.

5. The check valve according to claim 1, wherein the energy storage element is provided coaxially to the at least one guide rod and surrounds the at least one guide rod.

6. The check valve according to claim 1, wherein the energy storage element is provided in a pre-tensioned manner between the valve closing member and the guide element of the basic housing.

7. The check valve according to claim 1, wherein the guide element is positioned by at least one longitudinal rib in the flow channel of the base body.

8. The check valve according to claim 1, wherein the valve closing member has a spherical or projectile-shaped closing body, which is aligned in the force direction of the energy storage element and closes a valve seat, which is provided in a valve housing, which is fastenable to the basic housing or in the connecting device.

9. The check valve according to claim 8, wherein a recess is provided in an outer periphery of the closing body, said recess receiving a sealing element.

10. The check valve according to claim 9, wherein the closing body of the valve closing member rests with its outer surface again the valve seat in the initial position in a positive-locking manner, and the sealing element is provided downstream for the contact of the closing body with the valve seat and abuts the valve seat in a sealing manner.

11. The check valve according to claim 1, wherein the basic housing has an interface which points in the direction of the valve closing member and is connectable to a valve housing and a connection section of the valve housing is provided inside or outside the connection section of the basic housing.

12. The check valve according to claim 11, wherein the valve seat is formed on the valve housing or on a connection opening by a nozzle-shaped cross-sectional narrowing.

13. The check valve according to claim 11, wherein the valve housing has a constriction, into which a sealing element is insertable from the outside and the constriction adjoins an outer ring collar.

14. The check valve according to claim 11, wherein the interface, which is detachable, is formed as a latch, snap, plug, press or screw connection.

15. The check valve according to claim 11, wherein the smallest opening diameter of a connection opening of the connection device or the valve housing has a ratio to the total length of the check valve of from 0.2 to 4, or
the smallest opening diameter of the connection opening of the connection device or the valve housing has a ratio to the outer diameter of the check valve of from 1 to 2.5.

16. The check valve according to claim 1, wherein at least the valve housing, the basic housing or the valve closing member are manufactured from a one-component or two-component plastic or plastic-elastomer combination.

17. The check valve according to claim 1, wherein the largest outer diameter of the valve closing member comprises a ratio to the length of the valve closing member of from 0.3 to 3.

18. The check valve according to claim 1, wherein in the working position, the energy storage element is completely shielded from the flow channel by the guide section and the sleeve, which intermesh.

19. The check valve according to claim 1, wherein the energy storage element is provided in the guide section of the valve closing member and the sleeve of the guide element, or the energy storage element is provided outside the guide section and the sleeve of the guide element.

20. The check valve according to claim 19, wherein the guide section of the valve closing member is guided on the guide element by longitudinal ribs, which are provided between the guide section and the sleeve, wherein the sleeve is displaceably guided within or outside the guide element.

21. The check valve according to claim 1, wherein three spaced-apart guide rods are provided and aligned with one another in a star shape and are movable towards one another.

* * * * *